(12) United States Patent
Kajiwara (10) Patent No.: US 8,221,924 B2
(45) Date of Patent: Jul. 17, 2012

(54) FUEL CELL SYSTEM

(75) Inventor: Shigeto Kajiwara, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 961 days.

(21) Appl. No.: 12/295,130

(22) PCT Filed: Sep. 12, 2007

(86) PCT No.: PCT/JP2007/068215
§ 371 (c)(1),
(2), (4) Date: Sep. 29, 2008

(87) PCT Pub. No.: WO2008/047526
PCT Pub. Date: Apr. 24, 2008

(65) Prior Publication Data
US 2009/0162710 A1    Jun. 25, 2009

(30) Foreign Application Priority Data

Oct. 18, 2006 (JP) ................................. 2006-284165

(51) Int. Cl.
*H01M 8/04* (2006.01)
(52) U.S. Cl. ........................................ 429/429; 429/428
(58) Field of Classification Search .................... 429/429
See application file for complete search history.

(56) References Cited

U.S. PATENT DOCUMENTS

| 2004/0219401 A1* | 11/2004 | Hobmeyr et al. | 429/13 |
| 2006/0159966 A1* | 7/2006 | Wake et al. | 429/13 |
| 2006/0251932 A1* | 11/2006 | Wagner | 429/13 |

FOREIGN PATENT DOCUMENTS

| JP | 2002-246053 A | 8/2002 |
| JP | 2003-086220 A | 3/2003 |
| JP | 2003-115320 A | 4/2003 |
| JP | 2004-152532 A | 5/2004 |
| JP | 2005-141940 A | 6/2005 |
| JP | 2005-285610 A | 10/2005 |
| JP | 2005-302491 A | 10/2005 |
| JP | 2006-92801 A | 4/2006 |
| JP | 2006-179472 A | 7/2006 |
| WO | WO 2006-057134 A1 | 6/2006 |

* cited by examiner

*Primary Examiner* — Ula C Ruddock
*Assistant Examiner* — Jacob Marks
(74) *Attorney, Agent, or Firm* — Kenyon & Kenyon LLP (57) ABSTRACT

A fuel cell system includes: a fuel cell stack for generating electric power by receiving supply of a reaction gas; an air compressor for scavenging water remaining in the fuel cell stack when power generation is stopped; a rechargeable battery for supplying electric power to the air compressor for operation thereof; and a controller for estimating an amount of water remaining in the fuel cell stack based on an alternating-current impedance of the fuel cell stack, estimating a target SOC for charging the rechargeable battery with electric power required for scavenging the amount of water, and controlling charge and discharge so that an SOC of the rechargeable battery agrees with the target SOC.

2 Claims, 6 Drawing Sheets

FUEL CELL SYSTEM

This is a 371 national phase application of PCT/JP2007/068215 filed 12 Sep. 2007, which claims priority to Japanese Patent Application No. 2006-284165 filed 18 Oct. 2006, the contents of which are incorporated herein by reference.

TECHNICAL FIELD

The present invention relates to a fuel cell system for supplying a scavenging gas to a fuel cell stack and draining water in the fuel cell stack when power generation is stopped.

BACKGROUND ART

Recently, as part of efforts to address environmental issues, low-emission vehicles have been developed, and fuel cell vehicles having a fuel cell system as an in-vehicle power source are provided as one of the low-emission vehicles. The fuel cell system is an energy conversion system for supplying a reaction gas to a membrane electrode assembly in which an anode is disposed on one side of an electrolyte membrane and a cathode is disposed on the other side of the electrolyte membrane, and generating an electrochemical reaction, so as to convert chemical energy to electrical energy. Among the fuel cell systems, a solid polymer electrolyte fuel cell system in which a solid polymer membrane is used as an electrolyte is expected to be used as an in-vehicle power source since the solid polymer electrolyte fuel cell system can be miniaturized at low cost and has a high output density.

Water produced during the electrochemical reaction of the reaction gas, or humidifying water for the reaction gas remains in a gas channel of the fuel cell stack. When power generation is stopped with the remaining water left inside, the remaining water freezes in a low-temperature environment and diffusion of the reaction gas to the membrane electrode assembly is prevented. Thus, low-temperature startability is deteriorated.

Under such circumstances, a scavenging process of driving an air compressor by electric power from an electric storage device and draining water remaining in the gas channel of the fuel cell stack has been conventionally performed when power generation is stopped. Japanese Patent Laid-Open No. 2006-179472 discloses a method of determining whether the scavenging process is required when power generation is stopped and, when it is determined that the scavenging process is required, changing a charge threshold value for charging the electric storage device by the fuel cell stack to a higher value than a normal threshold value.

[Patent Document 1] Japanese Patent Laid-Open No. 2006-179472

DISCLOSURE OF THE INVENTION

However, although the electric power required for the scavenging process differs largely depending on the amount of water remaining in the gas channel, the charge threshold value for charging the electric storage device when it is determined that the scavenging process is required is set to a fixed value in the method disclosed in Japanese Patent Laid-Open No. 2006-179472. Thus, there is a possibility that the electric power required for the scavenging process is insufficient and the scavenging process is not properly performed depending on the amount of remaining water.

It is therefore an object of the present invention to solve the problems as described above, and provide a fuel cell system capable of performing a required and adequate scavenging process.

In order to achieve the object as described above, a fuel cell system according to the present invention comprises: a fuel cell stack for generating electric power by receiving supply of a reaction gas; a scavenging device for scavenging water remaining in the fuel cell stack when power generation is stopped; an electric storage device for supplying electric power to the scavenging device for operation thereof; an estimating device for estimating an amount of water remaining in the fuel cell stack based on an alternating-current impedance of the fuel cell stack, and estimating a target SOC for charging the electric storage device with electric power required for scavenging the amount of water; and an SOC control device for controlling charge and discharge of the electric storage device so that an SOC of the electric storage device agrees with the target SOC.

The amount of water remaining in the fuel cell stack can be estimated based on the alternating-current impedance of the fuel cell stack. By estimating the target SOC for charging the electric storage device with the electric power required for scavenging the water remaining in the fuel cell stack when power generation is stopped and controlling charge and discharge of the electric storage device so that the SOC of the electric storage device agrees with the target SOC, the electric power required for the scavenging process can be stored in the electric storage device without excess or deficiency.

A fuel cell system according to another aspect of the present invention comprises: a fuel cell stack for generating electric power by receiving supply of a reaction gas; a scavenging device for scavenging water remaining in the fuel cell stack when power generation is stopped; an electric storage device for supplying electric power to the scavenging device for operation thereof; an estimating device for estimating an amount of water remaining in the fuel cell stack based on a water balance calculation of the fuel cell stack, and estimating a target SOC for charging the electric storage device with electric power required for scavenging the amount of water; and an SOC control device for controlling charge and discharge of the electric storage device so that an SOC of the electric storage device agrees with the target SOC.

The amount of water remaining in the fuel cell stack can be estimated based on the water balance calculation (balance calculation of produced water amount, removed water amount, and humidifying water amount) of the fuel cell stack. By estimating the target SOC for charging the electric storage device with the electric power required for scavenging the water remaining in the fuel cell stack when power generation is stopped and controlling charge and discharge of the electric storage device so that the SOC of the electric storage device agrees with the target SOC, the electric power required for the scavenging process can be stored in the electric storage device without excess and deficiency.

BEST MODE FOR CARRYING OUT THE INVENTION

Figure 1:
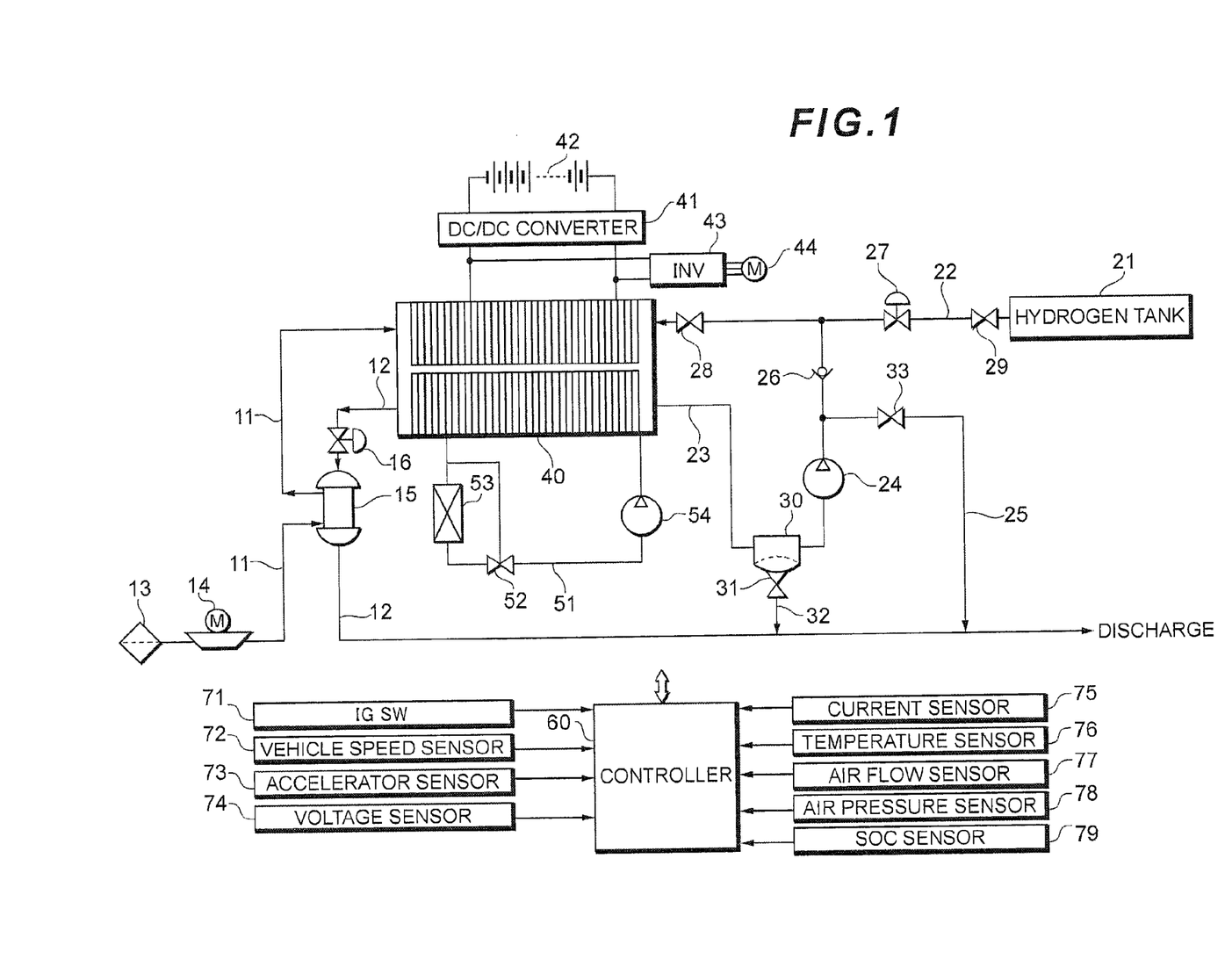
FIG. 1 is a system block diagram of a fuel cell system according to the present embodiment.

FIG. 1 shows the system configuration of a fuel cell system 10 according to the present embodiment.

The fuel cell system 10 serves as an in-vehicle power generating system of a fuel cell vehicle, and comprises a solid polymer electrolyte fuel cell stack 40 having a stack structure with a plurality of cells stacked in layers. The cells comprise a membrane electrode assembly in which an anode is disposed on one side of an electrolyte membrane and a cathode is disposed on the other side of the electrolyte membrane, and a separator in which a gas channel (anode gas channel, cathode gas channel) for delivering a reaction gas (fuel gas, oxidizing gas) to the membrane electrode assembly, and a refrigerant passage for delivering a refrigerant are formed. The fuel cell stack 40 generates electric power by receiving supply of a hydrogen gas (fuel gas) to the anode and an oxygen gas (oxidizing gas) to the cathode.

In the fuel cell stack 40, an oxidation reaction shown in the equation (1) is generated in the anode, and a reduction reaction shown in the equation (2) is generated in the cathode. An electrogenic reaction shown in the equation (3) is generated in the entire fuel cell stack 40.

$$H_2 \rightarrow 2H^+ + 2e^- \qquad (1)$$

$$(½)O_2 + 2H^+ + 2e^- \rightarrow H_2O \qquad (2)$$

$$H_2 + (½)O_2 \rightarrow H_2O \qquad (3)$$

In an oxygen gas supplying system of the fuel cell system 10, an oxygen gas supply passage 11 for supplying an oxygen gas to the fuel cell stack 40, and an oxygen off-gas discharge passage 12 for discharging an oxygen off-gas discharged from the fuel cell stack 40 to the outside are disposed. A filter 13 for removing dust or the like included in an oxygen gas in the atmosphere, an air compressor 14 for pressurizing the oxygen gas, and a humidifying module 15 for properly humidifying the oxygen gas pressurized by the air compressor 14 are disposed in the oxygen gas supply passage 11.

The humidifying module 15 carries out a moisture exchange between a low-humidity oxygen gas (dry gas) introduced from the atmosphere and a high-humidity oxygen off-gas (wet gas) discharged from the cathode of the fuel cell stack 40. Since water is produced in the cathode as shown in the equation (2), the oxygen off-gas discharged from the cathode includes a large amount of water. The oxygen gas humidified by the humidifying module 15 is supplied via the oxygen gas supply passage 11 to the fuel cell stack 40, which thereby generates electric power. The oxygen off-gas discharge passage 12 is a pipe disposed in an oxygen gas discharging system. A pressure regulating valve 16 for regulating the pressure of the oxygen gas in the fuel cell stack 40 is disposed between the humidifying module 15 and the fuel cell stack 40. The oxygen off-gas flowing in the oxygen off-gas discharge passage 12 passes through the pressure regulating valve 16 to be supplied for the moisture exchange by the humidifying module 15, and then, is discharged to the atmosphere outside the system as an exhaust gas.

In a hydrogen gas supplying system of the fuel cell system 10, a hydrogen tank 21 as a hydrogen supply source which stores a high-pressure hydrogen gas, a hydrogen gas supply passage 22 for supplying the hydrogen gas filled inside the hydrogen tank 21 to the fuel cell stack 40, an isolation valve 29 for controlling supply/stoppage of the hydrogen gas from the hydrogen tank 21 to the hydrogen gas supply passage 22, an isolation valve 28 for controlling supply/stoppage of the hydrogen gas from the hydrogen gas supply passage 22 to the fuel cell stack 40, a circulation passage 23 for returning a hydrogen off-gas (unreacted hydrogen gas) discharged from the fuel cell stack 40 to the hydrogen off-gas discharge passage 22, a hydrogen pump 24 for pressurizing and delivering the hydrogen off-gas flowing in the circulation passage 23 to the hydrogen gas supply passage 22, and a discharge passage 25 which is branched from the circulation passage 23 and joins the oxygen off-gas discharge passage 12 are disposed.

A regulator 27 for regulating the pressure of the high-pressure hydrogen gas flowing from the hydrogen tank 21 is inserted in the upstream side of the hydrogen off-gas discharge passage 22, and the circulation passage 23 joins the downstream side from the regulator 27. The hydrogen gas flowing from the hydrogen tank 21 to the hydrogen gas supply passage 22 and the hydrogen off-gas flowing back in the circulation passage 23 join together in a connection point of the hydrogen gas supply passage 22 and the circulation passage 23 to be a mixed gas, which is supplied to the fuel cell stack 40. A check valve 26 for preventing reverse flow of the hydrogen off-gas flowing back to the fuel cell stack 40 is inserted in the downstream side of the circulation passage 23 from the hydrogen pump 24.

A gas-liquid separator 30 for separating water from the hydrogen off-gas flowing in the circulation passage 23 is inserted in the upstream side from the hydrogen pump 24. A fluid flowing in the circulation passage 23 includes the hydrogen off-gas discharged from the fuel cell stack 40 and produced water during an electrochemical reaction in the fuel cell stack 40. The gas-liquid separator 30 separates the produced water from the hydrogen off-gas. The hydrogen off-gas from which the water is separated is returned to the fuel cell stack 40 by the hydrogen pump 24, while the water retrieved by the gas-liquid separator 30 is discharged via a drain valve 31 from a fluid pipe 32 to the oxygen off-gas discharge passage 12.

The upstream end of the fluid pipe 32 is connected to the drain valve 31 of the gas-liquid separator 30, and the downstream end of the fluid pipe 32 is connected to the oxygen off-gas discharge passage 12, into which the water separated by the gas-liquid separator 30 flows. A purge valve 33 which serves as a shut valve for opening and closing the discharge passage 25 is disposed in the discharge passage 25. By opening and closing the purge valve 33 as needed, impurities included in the hydrogen off-gas can be discharged with the hydrogen off-gas via the discharge passage 25 to the oxygen off-gas discharge passage 12. By discharging the impurities included in the hydrogen off-gas via the discharge passage 25, an impurity concentration in the hydrogen off-gas can be decreased and a hydrogen concentration in the hydrogen off-gas circulated and supplied to the fuel cell stack 40 can be increased.

In an electric power system of the fuel cell system 10, a rechargeable battery 42 as an electric storage device for storing electric power generated by the fuel cell stack 40 or regenerative energy during braking of a vehicle, a DC/DC converter 41 for adjusting an output voltage of the fuel cell stack 40 and controlling power supply distribution of the fuel cell stack 40 and the rechargeable battery 42, and a traction inverter 43 for converting direct-current power supplied from the fuel cell stack 40 or the rechargeable battery 42 to alternating-current power and supplying the alternating-current power to a traction motor (vehicle running motor) 44 are disposed.

The rechargeable battery 42 is the electric storage device capable of charging and discharging electric power, and serves as a storage source of regenerative energy during brake regeneration and an energy buffer during load change accompanying acceleration and deceleration of a fuel cell vehicle. For example, a nickel-cadmium storage battery, a nickel-hydrogen storage battery, a lithium rechargeable battery or the like are preferably used as the rechargeable battery 42. An electric storage device such as a capacitor may be used instead of the rechargeable battery 42.

In a cooling system of the fuel cell system 10, a refrigerant passage 51 for delivering a refrigerant to be circulated in the fuel cell stack 40, a refrigerant pump 54 for pressurizing and delivering the refrigerant along the refrigerant passage 51, a radiator 53 for cooling the refrigerant, a bypass valve 52 for delivering the refrigerant in the refrigerant passage 51 by bypassing the radiator 53 are disposed. By adjusting the amount of the refrigerant bypassing the radiator 53, the refrigerant temperature can be adjusted.

In a control system of the fuel cell system 10, a controller 60 for controlling the entire fuel cell system 10 is disposed. The controller 60 is a control unit (ECU) comprising a central processing unit (CPU), a memory unit (ROM, RAM), an input and output interface or the like. The controller 60 controls the fuel cell system 10 by monitoring the operation state based on sensor outputs from various sensors.

As the sensors, there are provided an ignition switch 71 for outputting start/stop signals, a vehicle speed sensor 72 for detecting a vehicle speed, an accelerator sensor 73 for detecting an accelerator position, a voltage sensor 74 for detecting an output voltage of each cell constituting the fuel cell stack 40, a current sensor 75 for detecting an output current (FC current) of the fuel cell stack 40, a temperature sensor 76 for detecting a temperature (FC temperature) of the fuel cell stack 40, an air flow sensor 77 for detecting a flow rate of air flowing from a cathode outlet of the fuel cell stack 40, an air pressure sensor 78 for detecting a pressure of air flowing from the cathode outlet of the fuel cell stack 40, an SOC (state of charge) sensor 79 for detecting an SOC of the rechargeable battery 42, or the like.

For example, when the controller 60 receives a start signal output from the ignition switch 71, the controller 60 starts operating the fuel cell system 10, and calculates required electric power of the entire system based on an accelerator position signal output from the accelerator sensor 73 or a vehicle speed signal output from the vehicle speed sensor 72. The required electric power of the entire system is a total sum of vehicle running electric power and accessory electric power. The accessory electric power includes, for example, electric power consumed by in-vehicle accessories (humidifying device, air compressor, hydrogen pump, cooling water circulation pump or the like), electric power consumed by apparatuses necessary for vehicle running (change gear, wheel control device, steering device, suspension device or the like), and electric power consumed by apparatuses disposed in a passenger space (air conditioner, lighting apparatus, audio system or the like).

The controller 60 determines output power distribution of the fuel cell stack 40 and the rechargeable battery 42, adjusts a revolution speed of the air compressor 14 or a valve position of the regulator 27 so that power generation of the fuel cell stack 40 agrees with the target electric power, and adjusts the amount of a reaction gas supplied to the fuel cell stack 40. The controller 60 also controls the DC/DC converter 41 and adjusts an output voltage of the fuel cell stack 40 to control an operation point (output voltage, output current) of the fuel cell stack 40: The controller 60 also outputs various alternating-current voltage command values of U phase, V phase and W phase, as a switching command, to the inverter 43 and controls an output torque and a revolution speed of the traction motor 44 so that a target vehicle speed corresponding to an accelerator position can be obtained.

Figure 2:
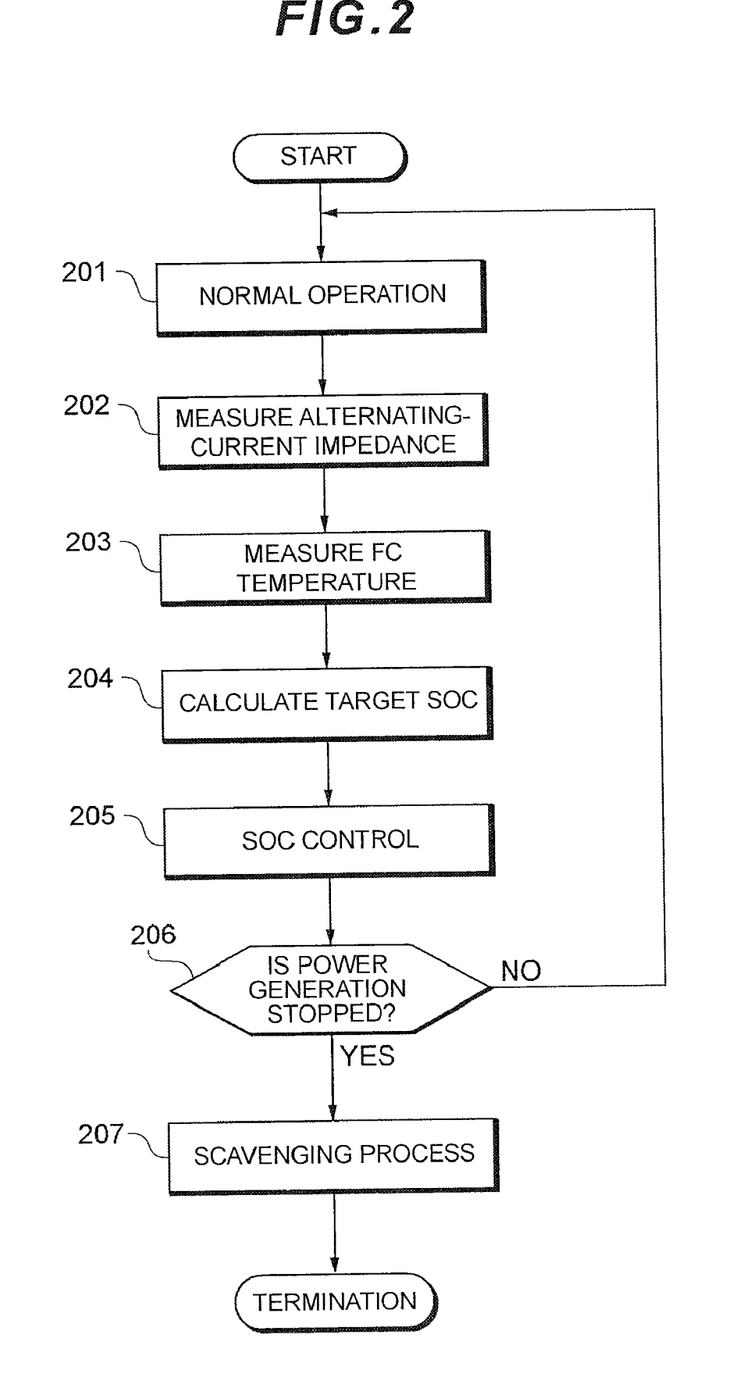
FIG. 2 is a flowchart for illustrating a first process for charging a rechargeable battery with electric power required for a scavenging process.

Next, a first process for charging the rechargeable battery 42 with electric power required for a scavenging process will be generally described with reference to FIG. 2.

When the controller 60 receives the start signal output from the ignition switch 71, the controller 60 starts normal operation (step 201). During the normal operation, the controller 60 calculates the required electric power of the entire system based on the accelerator position signal output from the accelerator sensor 73 or the vehicle speed signal output from the vehicle speed sensor 72, determines the output power distribution of the fuel cell stack 40 and the rechargeable battery 42, and controls accessories so that the power generation of the fuel cell stack 40 agrees with the target electric power.

The controller 60 controls the DC/DC converter 41, applies an alternating-current signal to the fuel cell stack 40, and detects the voltage response by the voltage sensor 74, to measure the alternating-current impedance of the fuel cell stack 40 (step 202).

When the response voltage, response current and alternating-current impedance of the fuel cell stack 40 at the time of applying the alternating-current signal to the fuel cell stack 40 are respectively denoted by E, I and Z, the following relational equation is known to be established.

$$E = E_0 \exp j(\omega t + \Phi)$$

$$I = I_0 \exp j\omega t$$

$$Z = E/I = (E_0/I_0) \exp j\Phi = R + j\chi$$

$E_0$ denotes an amplitude of the response voltage, $I_0$ denotes an amplitude of the response current, $\omega$ denotes an angular frequency, $\Phi$ denotes an initial phase, R denotes a resistance component (real part), $\chi$ denotes a reactance component (imaginary part), j denotes an imaginary unit, and t denotes time.

The controller 60 measures an FC temperature based on an output of the temperature sensor 76 (step 203).

The controller 60 estimates the amount of water remaining in the fuel cell stack 40 based on the alternating-current impedance measured in the step 202, and calculates an SOC (referred to as SOC1 below) for charging the rechargeable battery 42 with electric power required for scavenging the amount of water. The controller 60 also estimates a drying rate (the amount of drained water per unit time) for scavenging the water in the fuel cell stack 40 based on the FC temperature measured in the step 203, and calculates an SOC (referred to as SOC2 below) for charging the rechargeable battery 42 with electric power required for scavenging the remaining water at the drying rate. The controller 60 sets either SOC1 or SOC 2 which has a higher value as a target SOC (step 204).

The controller 60 controls charge and discharge of the rechargeable battery 42 so that the SOC of the rechargeable battery 42 agrees with the target SOC by monitoring the SOC of the rechargeable battery 42 based on an output value of the SOC sensor 79 (step 205).

Then, the controller 60 determines whether there is a request for stopping power generation (step 206). When the ignition switch 71 is switched OFF from ON, the request for stopping power generation is output to the controller 60. Unless there is the request for stopping power generation (step 206; NO), the controller 60 executes the processes of the steps 201 to 205.

Since the alternating-current impedance or temperature of the fuel cell stack 40 changes constantly depending on the operation state, the target SOC also changes constantly depending on the operation state. The controller 60 follows the target SOC which changes constantly to control charge and discharge of the rechargeable battery 42.

When the controller 60 receives the request for stopping power generation (step 206; YES), the controller 60 drives the air compressor 14 by using the electric power stored in the rechargeable battery 42, and supplies a scavenging gas to the gas channel in the fuel cell stack 40, so as to scavenge the water in the gas channel (step 207). The air compressor 14 serves as a scavenging device for scavenging water in the fuel cell stack 40.

In the step 202, the alternating-current impedance of the fuel cell stack 40 may be measured by using an internal resistance measuring device. The internal resistance measuring device is, for example, a high-frequency impedance measuring device capable of obtaining the alternating-current impedance of the fuel cell stack 40 by applying a high-frequency current to the fuel cell stack 40 and detecting the voltage response.

Figure 3:
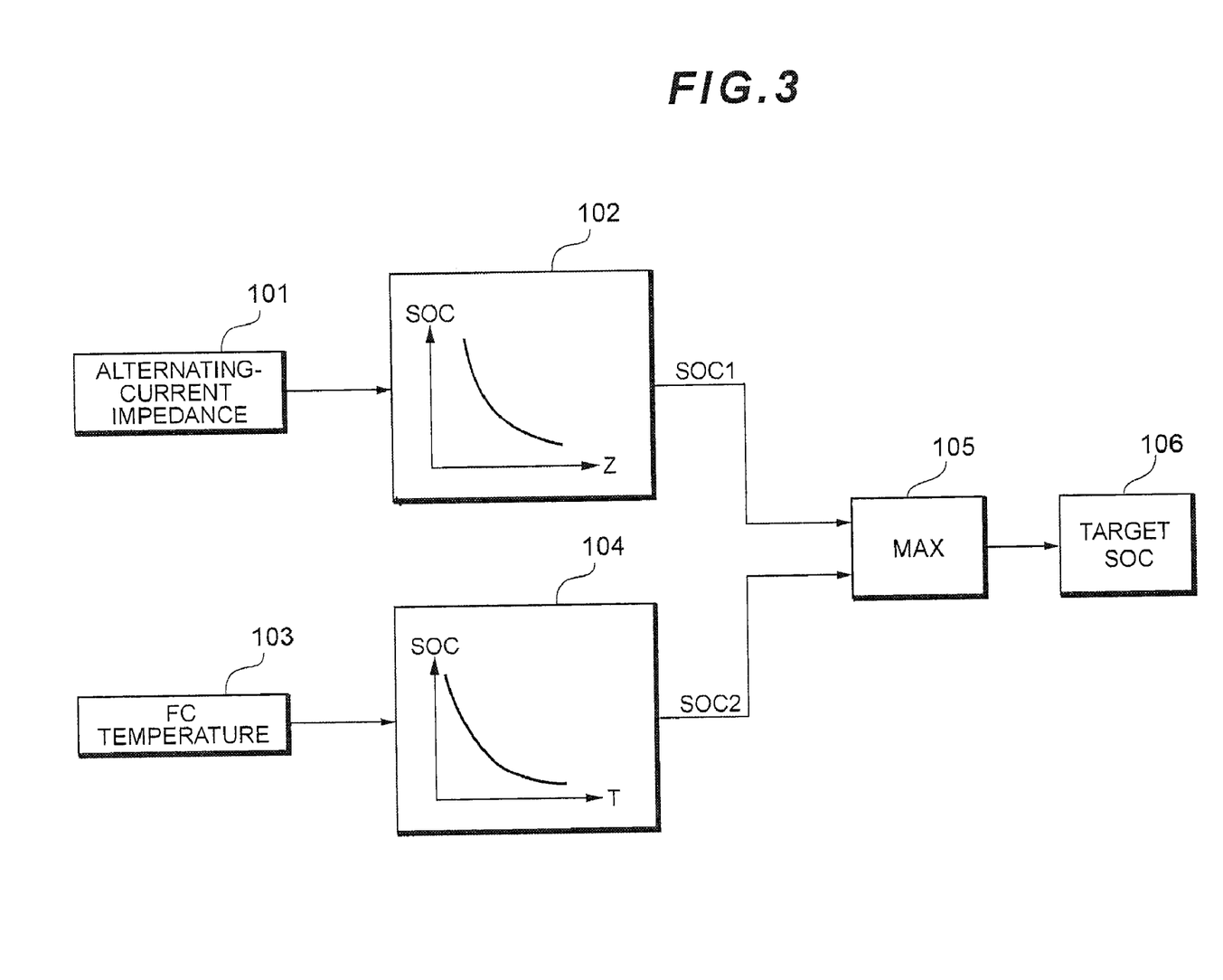
FIG. 3 is an explanatory diagram for illustrating a calculation process of a target SOC.

A calculation process of the target SOC (step 204) will be described in detail with reference to FIG. 3.

The controller 60 calculates the SOC1 based on the alternating-current impedance 101 measured in the step 202 and alternating-current impedance/SOC map data 102. The alternating-current impedance/SOC map data 102 is map data in which the lateral axis represents the alternating-current impedance and the vertical axis represents the SOC, and the SOC for charging the rechargeable battery 42 with the electric power required for scavenging the amount of water estimated from the alternating-current impedance is plotted thereon.

The controller 60 calculates the SOC2 based on the FC temperature 103 measured in the step 203 and FC temperature/SOC map data 104. The FC temperature/SOC map data 104 is map data in which the lateral axis represents the FC temperature and the vertical axis represents the SOC, and the SOC for charging the rechargeable battery 42 with the electric power required for scavenging the remaining water at the drying rate calculated from the FC temperature is plotted thereon. When the FC temperature 103 is high, the drying rate is fast and therefore, smaller electric energy is required for scavenging. When the FC temperature 103 is low, the drying rate is slow and therefore, more electric energy is required for scavenging.

The controller 60 assigns arguments SOC1 and SOC2 to a MAX function 105, and sets the returned value as a target SOC 106. The MAX function 105 is a function which returns the maximum value of a plurality of arguments.

The amount of water remaining in the fuel cell stack 40 can be estimated based on the alternating-current impedance of the fuel cell stack 40. By estimating the target SOC for charging the rechargeable battery 42 with the electric power required for scavenging the water remaining in the fuel cell stack 40 when power generation is stopped and controlling charge and discharge of the rechargeable battery 42 so that the SOC of the rechargeable battery 42 agrees with the target SOC, the electric power required for the scavenging process can be stored in the rechargeable battery 42 without excess or deficiency.

The controller 60 serves as an estimating device for estimating the amount of water remaining in the fuel cell stack 40 based on the alternating-current impedance of the fuel cell stack 40, and estimating the target SOC for charging the rechargeable battery 42 with the electric power required for scavenging the water amount (step 204), and an SOC control device for controlling charge and discharge of the rechargeable battery 42 so that the SOC of the rechargeable battery 42 agrees with the target SOC (step 205).

Figure 4:
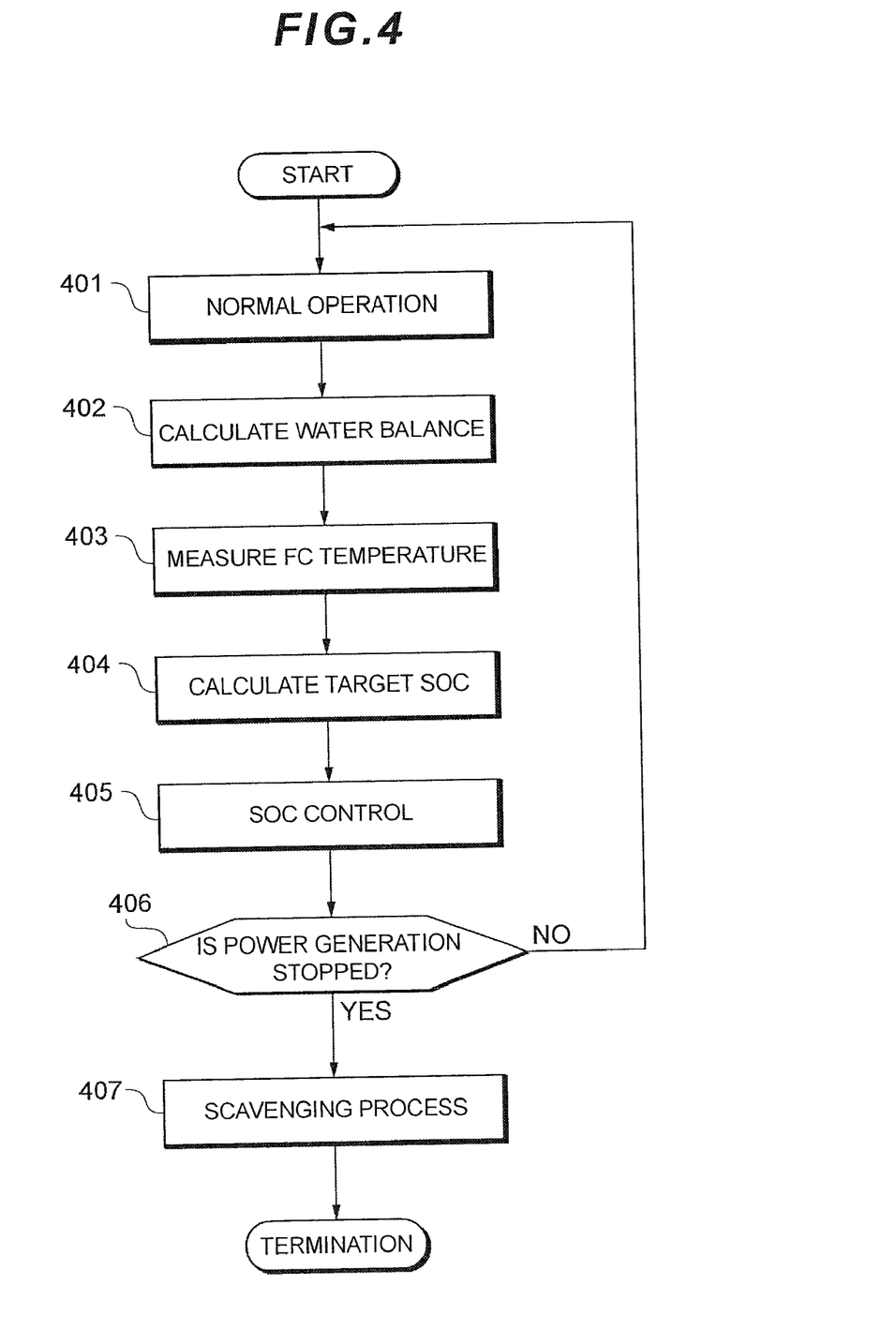
FIG. 4 is a flowchart for illustrating a second process for charging a rechargeable battery with electric power required for a scavenging process.

Next, a second process for charging the rechargeable battery 42 with electric power required for the scavenging process will be generally described with reference to FIG. 4.

In the first process as described above, the alternating-current impedance is measured by controlling the DC/DC converter 41 to apply the alternating-current signal to the fuel cell stack 40 and detect the voltage response. However, in an operation range where the dead time correction amount of the DC/DC converter 41 largely changes, response performance of the DC/DC converter 41 is lowered, and thus, the alternating-current impedance cannot be accurately measured by using the DC/DC converter 41 in some cases. In such cases, it is preferable to temporarily stop measurement of the alternating-current impedance and estimate the amount of water in the fuel cell stack 40 based on a water balance calculation.

The second process differs from the first process in that the water balance calculation is executed (step 402) instead of the measurement of the alternating-current impedance (step 202). The other steps (step 401, steps 403 to 407) in the second process respectively correspond to the steps (step 201, steps 203 to 207) in the first process.

Since the amount of remaining water or temperature of the fuel cell stack 40 changes constantly depending on the operation state, the target SOC also changes constantly depending on the operation state. The controller 60 follows the target SOC which changes constantly to control charge and discharge of the rechargeable battery 42.

Figure 5:
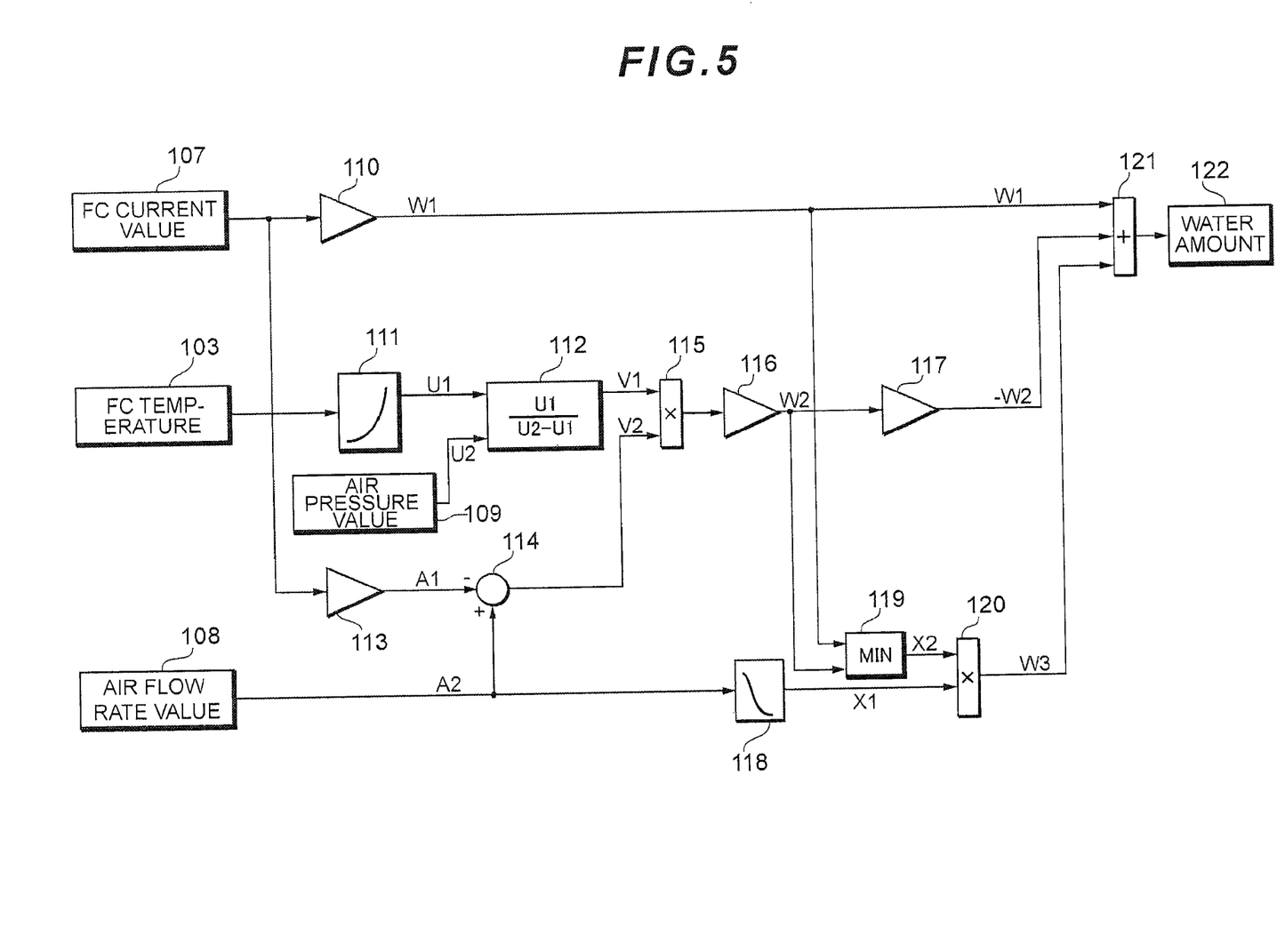
FIG. 5 is an explanatory diagram for illustrating a calculation process of a water balance calculation.

A calculation process of the water balance calculation (step 402) will be described in detail with reference to FIG. 5.

The controller 60 multiplies an FC current value 107 measured from an output value of the current sensor 75 by a gain 110 to calculate a produced water amount W1 [g/sec]. The gain 110 is a constant value having the value of the number of cells/LVFF/2×18, and LVFF is a Faraday constant value (96500 C/mol). The controller 60 also calculates a water vapor pressure U1 from an FC temperature 103 measured from an output value of the temperature sensor 76 and water saturation water vapor properties map data 111, and measures an air pressure value 109 (referred to as air pressure value U2 below) from an output value of the air pressure sensor 78. The controller 60 assigns arguments U1 and U2 to a function 112 and calculates a partial pressure ratio V1 of water vapor and air.

The controller 60 multiplies the FC current value 107 measured from the output value of the current sensor 75 by a gain 113 to calculate an air consumption rate A1 [mol/sec]. The gain 113 is a constant value having the value of the number of cells/LVFF/4. The controller 60 measures an air flow rate value 108 (referred to as air flow rate value A2 [mol/sec] below) of the cathode outlet from an output value of the air flow sensor 77. The controller 60 calculates an air flow rate V2 converted to removed water by the air flow rate A2−air consumption rate A1. The controller 60 assigns arguments V1 and V2 to a multiplication function 115 and multiplies the returned value by a gain 116 to calculate a removed water amount W2 [g/sec]. The gain 116 is a constant value having the value of 18. The removed water amount W2 is multiplied by a gain 117 having the value of −1 and becomes a negative number.

The controller 60 calculates a water vapor exchange ratio X1 corresponding to the air flow rate A2 based on humidifying module water vapor exchange ratio map data 118. The controller 60 assigns arguments W1 and W2 to a MIN function 119 and sets the returned value as X2. The MIN function 119 is a function which returns the minimum value of a plurality of arguments. The controller 60 assigns arguments X1 and X2 to a multiplication function 120 and sets the returned value as a humidifying water amount W3 [g/sec]. The controller 60 assigns arguments W1, −W2 and W3 to an addition function 121 and sets the returned value as a water amount 122 remaining in the fuel cell stack 40.

Figure 6:
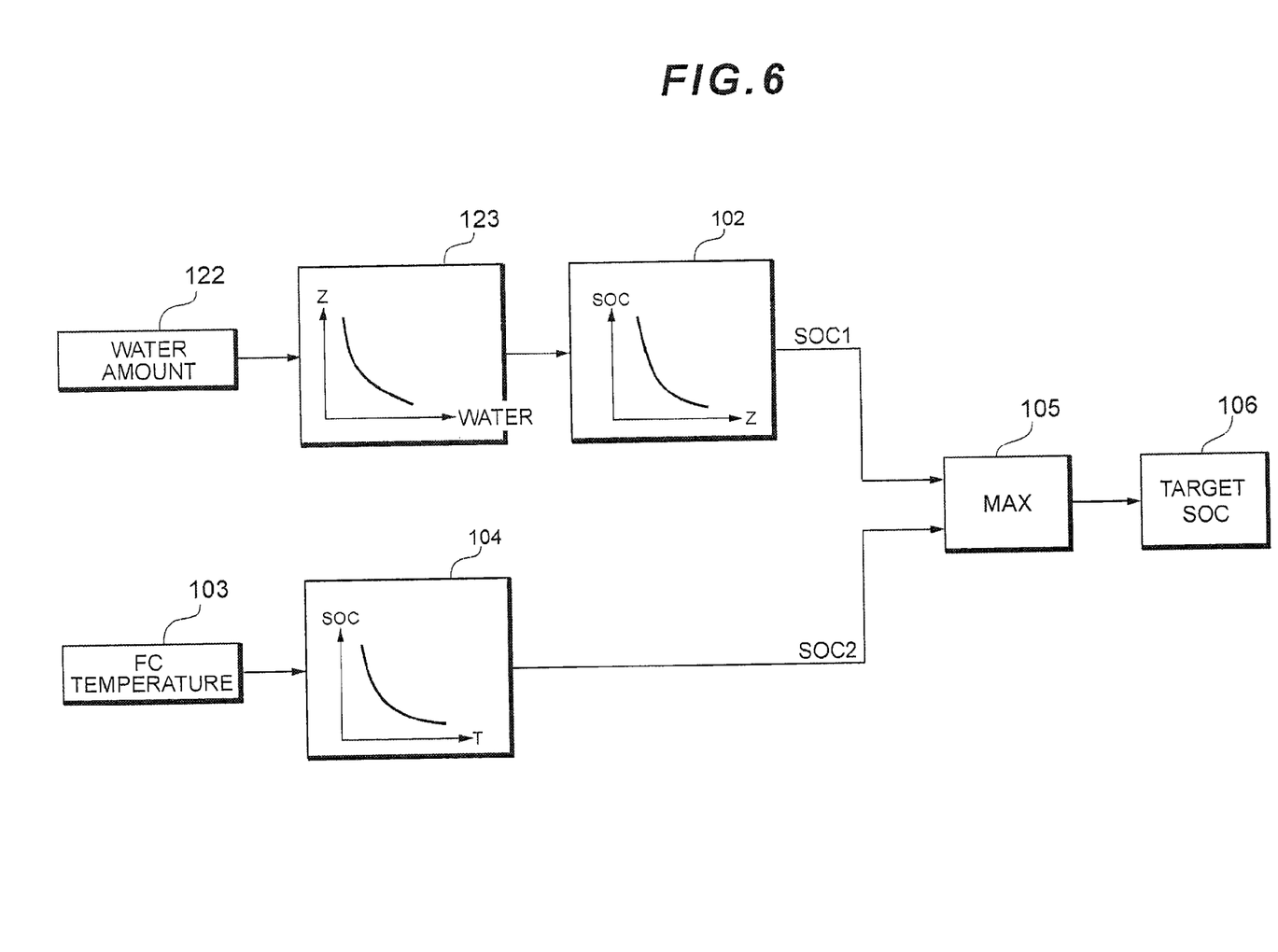
FIG. 6 is an explanatory diagram for illustrating a calculation process of a target SOC.

A calculation process of the target SOC (step 404) will be described in detail with reference to FIG. 6.

The controller 60 calculates the alternating-current impedance based on the water amount 122 obtained by the water balance calculation in the step 402 and water amount/alternating-current impedance map data 123. The water amount/alternating-current impedance map data 123 is map data in which the lateral axis represents the water amount and the vertical axis represents the alternating-current impedance, and the alternating-current impedance corresponding to the water amount is plotted thereon. The controller 60 calculates the SOC1 based on the alternating-current impedance and the alternating-current impedance/SOC map data 102.

The controller 60 calculates the SOC2 based on the FC temperature 103 measured in the step 403 and the FC temperature/SOC map data 104, and assigns arguments SOC1 and SOC2 to the MAX function 105 to set the returned value as the target SOC 106.

The amount of water remaining in the fuel cell stack 40 can be estimated by the water balance calculation of the fuel cell stack 40. By estimating the target SOC for charging the rechargeable battery 42 with the electric power required for scavenging the water remaining in the fuel cell stack 40 when power generation is stopped, and controlling charge and discharge of the rechargeable battery 42 so that the SOC of the rechargeable battery 42 agrees with the target SOC, the electric power required for the scavenging process can be stored in the rechargeable battery 42 without excess and deficiency.

The controller 60 serves as an estimating device for estimating the amount of water remaining in the fuel cell stack 40 based on the water balance calculation of the fuel cell stack 40 (step 402), and estimating the target SOC for charging the rechargeable battery 42 with the electric power required for scavenging the water amount (step 404), and an SOC control device for controlling charge and discharge of the rechargeable battery 42 so that the SOC of the rechargeable battery 42 agrees with the target SOC (step 405).

INDUSTRIAL APPLICABILITY

According to the present invention, it is possible to estimate the electric power required for the scavenging process based on the alternating-current impedance or the water balance calculation of the fuel cell stack, to store the electric power in the electric storage device during cell operation. Therefore, the required and adequate scavenging process can be performed when power generation is stopped.

The invention claimed is:

1. A fuel cell system comprising:
a fuel cell stack for generating electric power by receiving supply of a reaction gas;
a scavenging device for scavenging water remaining in the fuel cell stack when power generation is stopped;
an electric storage device for supplying electric power to the scavenging device for operation thereof;
a control system programmed to:
estimate an amount of water remaining in the fuel cell stack based on an alternating-current impedance of the fuel cell stack;
estimate a target SOC for charging the electric storage device with electric power required for scavenging the amount of water; and
control charge and discharge of the electric storage device before the fuel cell system is required to stop power generation so that an SOC of the electric storage device agrees with the target SOC.

2. A fuel cell system comprising:
a fuel cell stack for generating electric power by receiving supply of a reaction gas;
a scavenging device for scavenging water remaining in the fuel cell stack when power generation is stopped;
an electric storage device for supplying electric power to the scavenging device for operation thereof;
a control system programmed to:
estimate an amount of water remaining in the fuel cell stack based on a water balance calculation of the fuel cell stack;
estimate a target SOC for charging the electric storage device with electric power required for scavenging the amount of water; and
control charge and discharge of the electric storage device before the fuel cell system is required to stop power generation so that an SOC of the electric storage device agrees with the target SOC.

* * * * *